United States Patent [19]

Takemura

[11] Patent Number: 5,739,515
[45] Date of Patent: Apr. 14, 1998

[54] IC CARD READER/WRITER

[75] Inventor: Hisao Takemura, Kawasaki, Japan

[73] Assignee: Kabushiki Kaisha Toshiba, Kawasaki, Japan

[21] Appl. No.: 590,759

[22] Filed: Jan. 24, 1996

[30]   Foreign Application Priority Data

Jan. 24, 1995 [JP] Japan .................................. 7-008916

[51] Int. Cl.⁶ ...................................................... G06K 7/00
[52] U.S. Cl. ........................................... 235/441; 235/486
[58] Field of Search ................................ 235/441, 486; 361/684

[56]   References Cited

U.S. PATENT DOCUMENTS 5,473,505  12/1995  Kessoku et al. ........................ 361/684

FOREIGN PATENT DOCUMENTS 0 552 078   7/1993  European Pat. Off. .
43 10 517  10/1994  Germany .
6-131508    5/1994  Japan .
7-93490     4/1995  Japan .

OTHER PUBLICATIONS

Anonymous, "Plug-In Smar Card Holder", Research Disclosure, No. 327, Jul. 1, 1991, p. 491.

*Primary Examiner*—F. L. Evans
*Attorney, Agent, or Firm*—Cushman Darby & Cushman IP Group of Pillsbury Madison & Sutro LLP

[57]   ABSTRACT

An IC card reader/writer comprises a main unit and base frame spaced-apart through a connector provided at one end and through bent sections provided at the other end. The main unit and base frame define an IC card storage space between their opposed surfaces such that the bent sections provide guide surfaces along which the IC card is guided and have an external shape substantially equal to that of a standard card. The IC card reader/writer can be inserted into and withdrawn from a standard card holding section of a computer apparatus.

10 Claims, 5 Drawing Sheets

IC CARD READER/WRITER

BACKGROUND OF THE INVENTION

1. Field of the Invention

The present invention relates to an IC card reader/writer which can read information from or write information to, a thin-film type IC card for example.

2. Description of the Related Art

Conventionally, a processing apparatus for reading information from, or writing information to, a thin-type IC card is placed as an external apparatus connected by a cable, etc., to an interface, such as RS-232C, of a computer apparatus.

The conventional processing device is of a box-like structure with an IC card set therein. This structure can protect internal component parts and protect and position the card.

As shown in JPN PAT APPLN KOKOKU PUBLICATION 4-38027, for example, a contact holder holds contact pins in the box-like structure and is adapted to be moved up and down to allow the contact pins to be moved toward and away from an IC card inserted in the box-like structure.

With the conventional IC card reader/writer, the contact holder is moved up and down with the contact pins held in place resulting in a bulkier IC reader/writer in an external device connected to a host computer. This creates problems with the connection of a cable, a restricted location, and inconvenient transport by a user.

In the conventional method, the IC card reader/writer cannot be made thinner and be inserted into a slot in a standardized card type device in a hand-held computer.

SUMMARY OF THE INVENTION

It is accordingly the object of the present invention to provide an IC card reader/writer which can be made thinner and compact, involves neither a cable connection problem nor a restricted location problem in use and is very convenient to carry about.

According to the present invention, an IC card reader/writer comprises first and second plates spaced-apart to define an IC card storage space between opposed surfaces thereof and to provide an external shape substantially equal to that of a standard card. The reader/writer may be inserted into and withdrawn from a standard card holding section of an associated information processing apparatus.

By such a structure, the IC card can be used for an information processing apparatus, such as a hand-held personal computer, which has been used for standard cards.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

A first embodiment of the present invention will be explained below with reference to FIGS. 1 to 7.

Figure 1:
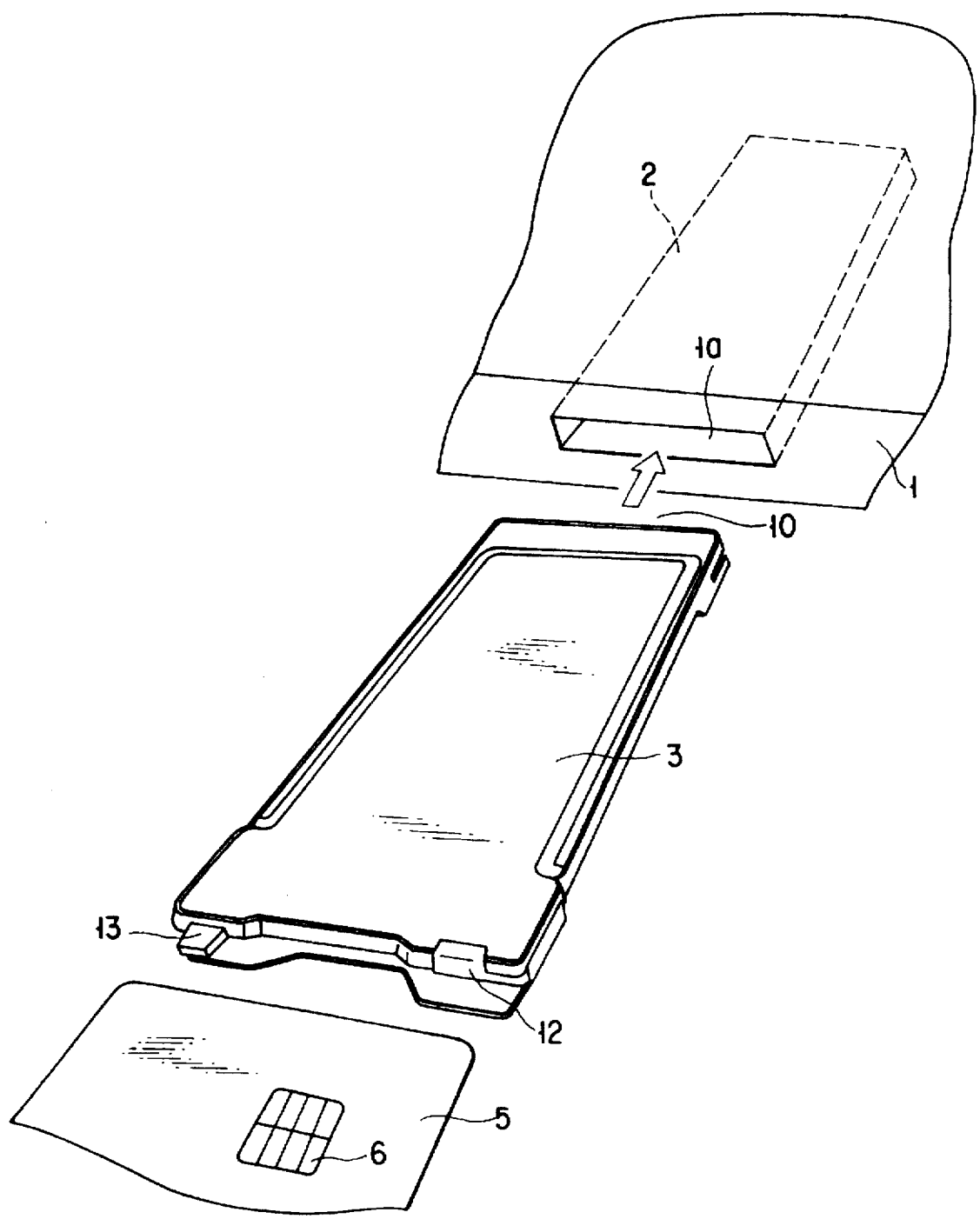
FIG. 1 is a perspective view showing an information processing apparatus and IC card reader/writer according to a first embodiment of the present invention.

FIG. 1 is a perspective view showing a computer 1, such as a notebook type personal computer as an information processing apparatus, an IC card reader/writer 3 and an IC card 5.

The computer apparatus 1 has an insertion inlet 1a at its front side to allow a card-type device to be inserted and a card holding section 2 provided for accommodating various kinds of cards, for example, a PC card (PCMCIA standard card) such as a memory card. The card holding section 2 is so dimensioned as to have a shape substantially satisfying the card standard. An associated connection area connected to the PC card is provided in the card holding section 2.

The IC card reader/writer 3 is inserted via the insertion inlet 1a into the card holding section 2 of the computer apparatus 1 and has an LED 12 and eject button 13 on a side opposite to the insertion inlet 1a side.

The IC card 5 has an IC (integrated circuit) terminal 6 and is inserted into the IC card reader/writer 3 and held there.

Figure 2:
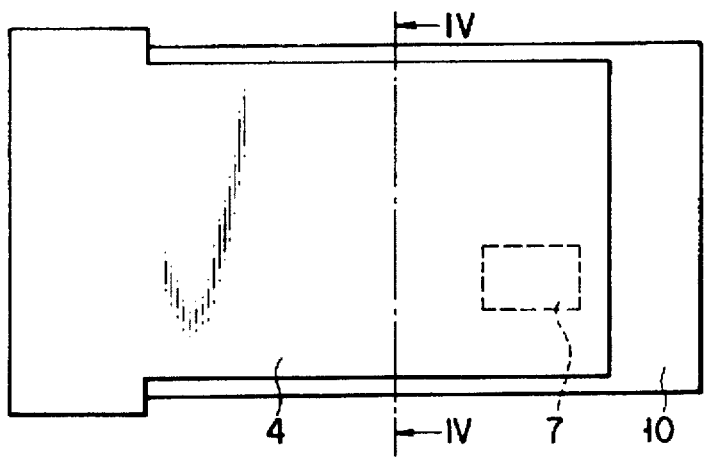
FIG. 2 is a top view showing the IC card reader/writer.

FIG. 2 is a top view showing the IC card reader/writer 3.

In FIG. 2, reference numeral 4 shows a main unit as a first plate. The main unit 4 includes a contact block 7 comprised of eight pins making contact with the IC terminal 6 of the IC card 5, an ejecting mechanism, not shown, for ejecting the IC card 5, and so on. The main unit 4 has a connector section 10 at one end which serves as a first support section.

Figure 3:
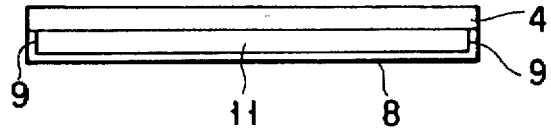
FIG. 3 is a front view showing the IC card reader/writer.

FIG. 3 is a front view showing the IC card reader/writer 3.

In FIG. 3, reference numeral 8 shows a base frame formed of metal or a molding and serving as a second plate. The base frame 8 principally protects the undersurface of the IC card 5 and enables the terminal 6 of the IC card 5 to be placed in positive contact with the contact block 7.

The base frame 8 and main unit 4 are spaced over 0.76 mm away from each other and, between their opposed surfaces, define a storage space 11 for holding the IC card therein.

Figure 4:
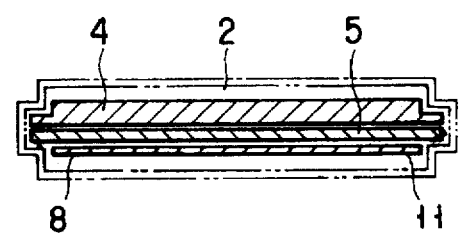
FIG. 4 is a cross-sectional view as taken along line IV—IV in FIG. 2.

FIG. 4 is a cross-sectional view, taken along line IV—IV in FIG. 2.

The IC card 5 is inserted into the storage space 11 between the base frame 8 and the main unit 4 and held therein.

Figure 5:
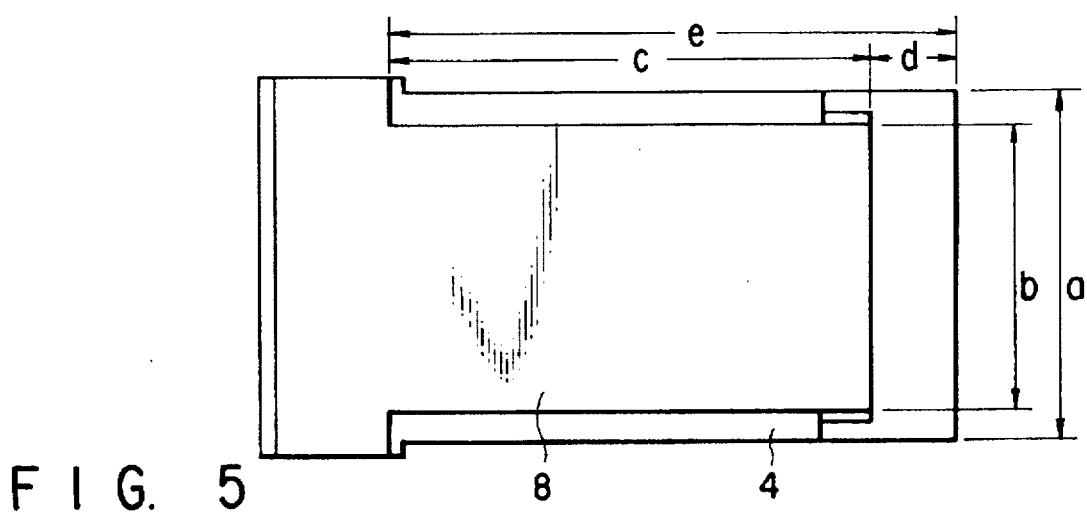
FIG. 5 is a cross-sectional view showing the IC card reader/writer.

FIG. 5 is a bottom view showing the IC card reader/writer.

The main unit 4 has a width dimension a of 54 mm equal to the width dimension of the standard PC card and the base frame 8 and main unit 4 are T-like in configuration. The base frame 8 has a width dimension b of below 48 mm at its narrower end section.

The base frame 8 has a length dimension c corresponding to a length obtained by subtracting, from a dimension e (above 85.6 mm) a dimension d (above 10 mm) from the forward end of the connector section 10 in FIG. 5. The section of the base frame 8 of the length dimension c is inserted in the card holding section 2 and the broader section thereof is externally projected from the card holding section 2.

Figure 6:
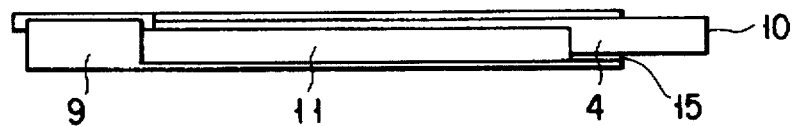
FIG. 6 is a side view showing the IC card reader/writer.

FIG. 6 is a side view showing the IC card reader/writer 3.

The sides of the base frame 8 and main unit 4 are supported through the connector section 10 serving as the first support section and through bent sections 9, 9 serving as second supports.

Figure 7:
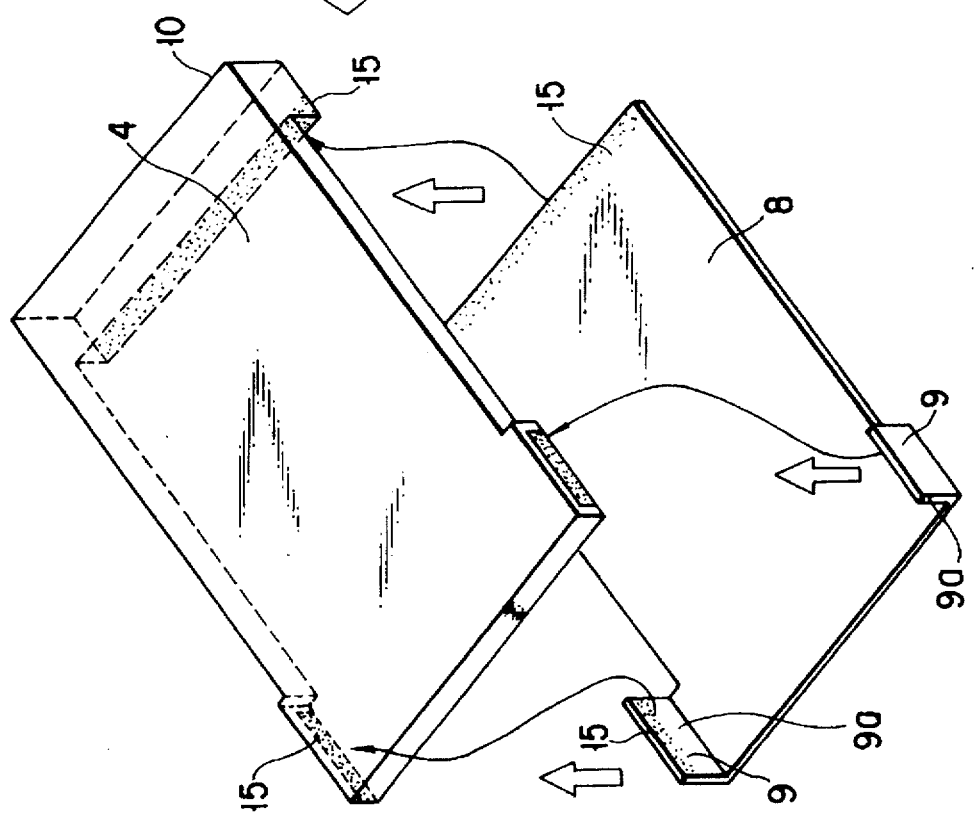
FIG. 7 is a perspective, exploded view showing the IC card reader/writer.

FIG. 7 is a perspective, exploded view showing the IC card reader/writer.

The lower surface of the connector section 10 of the main unit 4 is bonded by a bonding agent 15 to the upper surface of one end of the base frame 8. Both the side surfaces of the wider end section of the main unit 4 are fixedly bonded by the bonding agent 15 to the opposed inner surfaces of the upper side portions of the bent sections 9, 9 of the base frame 8.

Upon insertion of the IC card reader/writer 3 into the computer apparatus 1, the non-insertion-side end, that is, the bent sections 9, 9 of the base frame 8 and wider end section of the main unit 4 supported by the bent sections 9, 9 are externally positioned without being inserted into the computer apparatus 1. The externally positioned bent sections 9, 9 have their spaced-apart width dimension correspond to the width dimension of the IC card 5. The opposed surfaces 9a, 9a of the bent sections 9, 9 provide guide surfaces and, upon insertion of the IC card 5, serves as a guide means.

By the above structure, the IC card reader/writer 3 of the present invention has its main section so dimensioned as to substantially correspond to the standard of the card type device and, in a practical form, the reader/writer 3 has a maximum dimension of 55 mm in a thickness direction and a width dimension of 54 mm corresponding to that of the IC card 5 with a large scale integrated (LSI) circuit 6 mounted therein.

Upon insertion of the IC card 5 into the IC card reader/writer 3, an external shape defined by both the insertion section of the IC card reader/writer 3 into the computer apparatus 1 and IC card 5 substantially corresponds to that of the standard card-type device.

Thus, the IC card reader/writer 3 with the IC card 5 inserted therein is set in the card holding section 2 of the computer apparatus 1 via the insertion inlet 1a as shown in FIG. 4.

In the case where the IC card 5 is used for a hand-held personal computer 1, the IC card 5 is first inserted into the storage space 11 of the reader/writer 3 and, at this time of insertion, the IC card 5 is set in a predetermined position in the storage space 11 while being guided along the opposed surfaces 9a, 9a of the bent sections 9, 9 of the base frame 8. Then, the reader/writer 3 with the IC card 5 inserted therein is inserted into the card holding section 2 of the personal computer 1 via the insertion inlet 1a. By doing so, the connection section 10 of the reader/writer 3 is electrically connected to an associated connection area of the PC card in the computer apparatus 1 and set in a ready state.

As set out above, since the IC card reader/writer 3 can be set in the personal computer apparatus 1 at the card holding section 2 for a standardized memory card and so on, it can be used as one unit with the computer apparatus 1 and carried about. As a result, it can be freely used from place to place and is very convenient.

Further, the base frame 8 and main unit 4 are partially fixed at their end sections and their width dimension can be made smaller than the width dimension (54 mm) of the IC card 5, so that the base frame/main unit structure can be readily set in the card holding section 2 for those cards such as the standardized memory cards.

Further, according to the present invention, those heretofore complicated mechanisms have been simplified, so that associated component parts can be reduced and, in addition, the manufacturing costs can also be largely reduced.

Further, since the opposed surfaces 9a, 9a of the bent sections 9, 9 of the base frame 8 which are projected from the insertion inlet 1a of the computer apparatus 1 serve as the guide sections at the insertion of the IC card 5, it is possible to insert the IC card 5 in a correct direction without being tilted.

Figure 8:
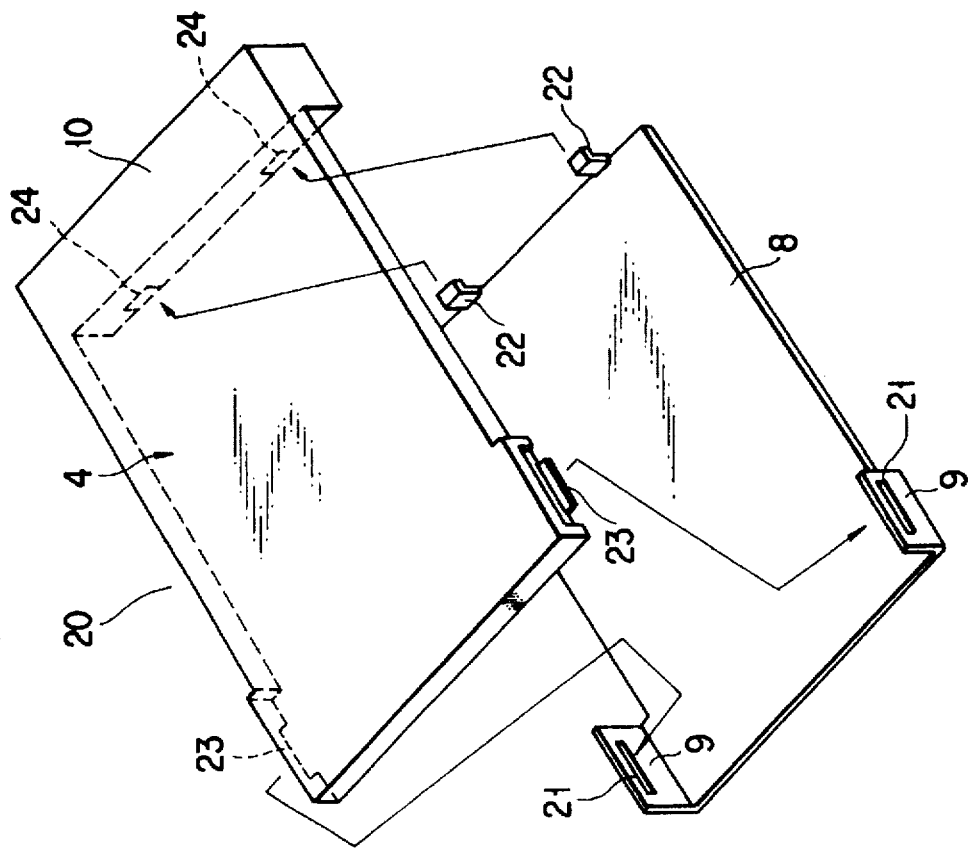
FIG. 8 is a perspective, exploded view showing an IC card reader/writer according to a second embodiment of the present invention.

FIG. 8 shows an IC card reader/writer 20 according to another embodiment of the present invention.

Elongated holes 21, 21 are provided in bent section 9, 9, respectively, of a one-end of a base frame 8 of an IC card reader/writer 20 and engaging claws 22, 22 are provided on an other-end of the base frame 8. A main unit 4 has projections 23, 23 at both opposite end portions of its wide-end side and engaging holes 24, 24 at its non-wide end side.

The main unit 4 is mounted on the base frame 8 with its projections 23, 23 fitted in the elongated holes 21, 21 in the bent sections 9, 9 of the base frame 8 and its engaging holes 24, 24, that is, its engaging holes 24, 24 on a connector section 10 side, fitted over engaging claws 22, 22 of the base frame 8.

According to this embodiment, it is possible to mount the main unit 4 on the base frame 8 without the need to bond them and hence to improve an assembling operation.

FIGS. 9 to 13 show a third embodiment of the present invention.

Figure 9:
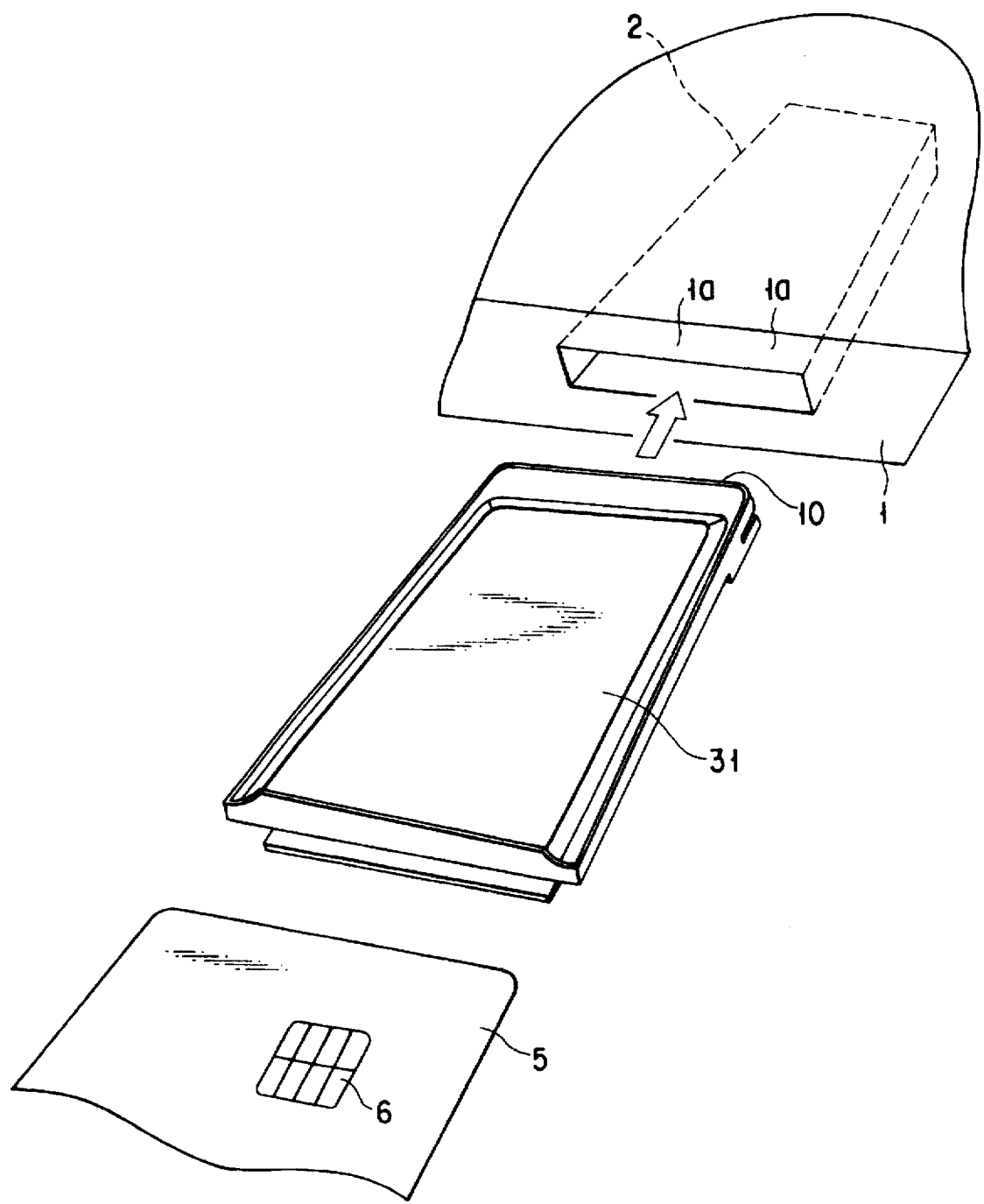
FIG. 9 is a perspective view showing an information processing apparatus and IC card reader/writer according a third embodiment of the present invention.

FIG. 9 shows a computer apparatus 1, such as a notebook type personal computer, serving as an information processing apparatus, an IC card reader/writer 31 and an IC card 5.

The computer apparatus 1 has an insertion inlet 1a at the front face side to allow a card-type device to be inserted therein and a card holding section 2 therein which has a dimension of a shape substantially corresponding to various kinds of card standards.

The IC card reader/writer 31 is inserted into the computer apparatus 1 via the insertion inlet 1a to have its connector section 10 electrically connected to an associated connection section in the computer apparatus 1. The IC card reader/writer 31 has its greater portion so dimensioned as to have a shape substantially corresponding to a card type device standard and, in a practical form, have a maximum thickness of 5 mm and a width of 54 mm equal to the dimension of the IC card 5 with an LSI (large scale integrated) circuit 6 mounted therein.

Figure 10:
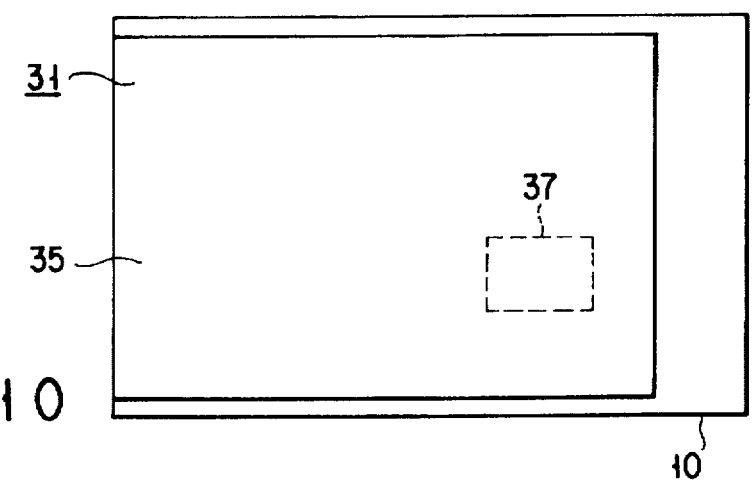
FIG. 10 is a top view showing the IC card reader/writer.

FIG. 10 is a top view showing the IC card reader/writer 31.

The IC card reader/writer 31 has a main unit 35 as a first plate. A contact block 37 comprised of eight pins is provided at the main unit 35 to allow it to make contact with the IC card 5 and an ejecting mechanism, etc., not shown, is provided at the main unit 35 to eject the IC card out of the 5 reader/writer 31.

Figure 11:
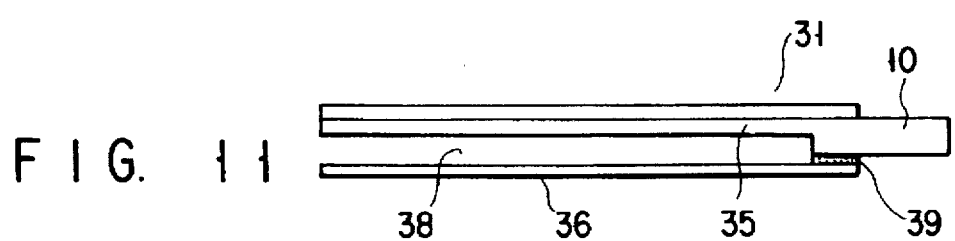
FIG. 11 is a side view showing the IC card reader/writer.

FIG. 11 is a side view showing the IC card reader/writer 31.

In FIG. 11, reference numeral 36 shows a base frame as a second plate. The base frame 36 has the main function of protecting the undersurface of the IC card 5 and ensuring positive contact of the contact block 37 with an IC terminal.

Figure 12:
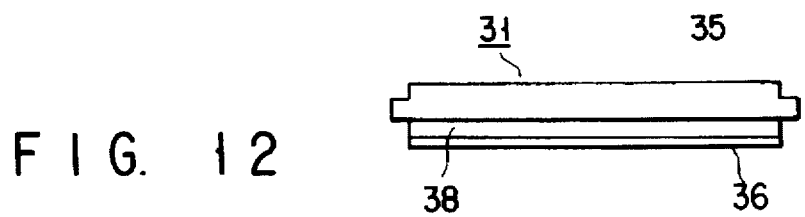
FIG. 12 is a front view showing the IC card reader/writer.

FIG. 12 is a front view showing an IC card reader/writer 31.

The main unit 35 and base frame 36 are spaced over 0.76 mm apart from each other to define an IC card storage space between their opposed surfaces.

Figure 13:
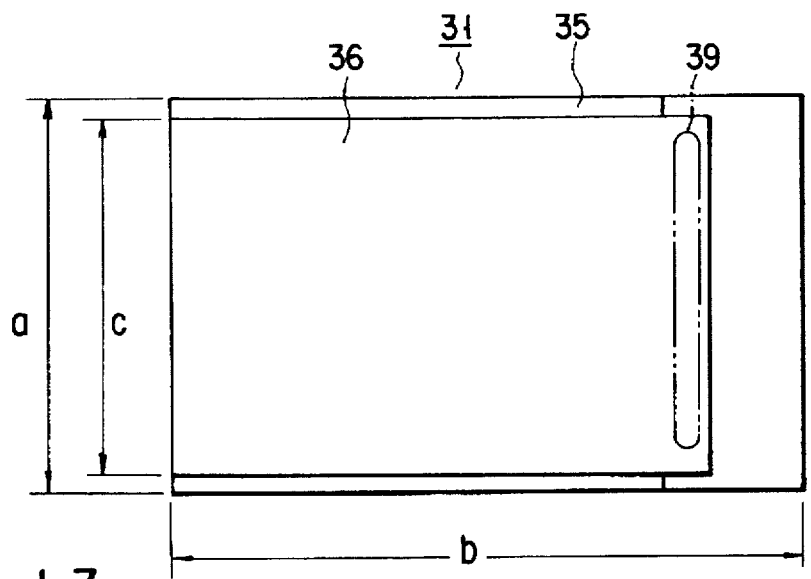
FIG. 13 is a bottom view showing the IC card reader/writer.

FIG. 13 is a bottom view showing the IC card reader/writer 31.

The main unit 35 has a width dimension a of 54 mm equal to that of the IC card 5 and a length dimension b of 85.6 mm and the base frame 36 has a width dimension c of below 48 mm.

The IC card reader/writer 31 is different in configuration from those of the above-mentioned embodiments and is of such a type that it can be completely inserted into the computer apparatus 1.

Further, the main unit 35 is only 54 mm in width dimension the same as that of the IC card 5, so that the main unit is fixed to the base frame 36 at one place or that the main unit is made integral with the base frame 36.

Stated in more detail, when the main unit 35 is fixed to the base frame 36, a connector section 10 of the main unit 35 is fixed at its lower surface portion to the base frame 36 by means of a bonding agent 39.

Further, if the main unit 35 is to be formed integral with the base frame 36, they are molded in one piece form.

In either method, the final configuration of the IC card reader/writer 31 takes on a U-shape as seen in a side view in FIG. 11.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An IC card reader/writer adapted to be inserted into a memory card storage section of an information processing apparatus, the memory card storage section having an area of connection to a memory card, comprising:

first and second plates arranged in an opposite relation to define an IC card storage space therebetween, a width of the plates being substantially equal to that of the IC card, a length of the plates in an insertion direction of the memory card being greater than a depth direction length of the memory card storage section, and a projection formed at a rear end side viewed in the insertion direction and outwardly extending from the memory card storage section;

a connector section provided on a forward end side of the first and second plates in a direction from the insertion direction of the memory card and fixing the first and second plates in place, the connector section being connected to the connection area in the memory card storage section; and a contact section provided on the first plate to allow connection to be made to terminals of the IC card inserted into the IC card storage space.

2. The IC card reader/writer according to claim 1, wherein the first plate and connector section are formed integral with each other.

3. The IC card reader/writer according to claim 1, further comprising a pair of opposite-bent sections integrally provided on the projection of one of the first and second plates and fixed to the other plate to allow side edges of the IC card to be guided therealong in a given position when the IC card is inserted into the IC card storage space.

4. The IC card reader/writer according to claim 3, wherein the first and second plates are adhesively joined together at the pair of opposite bent sections.

5. The IC card reader/writer according to the claim 1, wherein the first and second plates are latchably joined together at the contact section.

6. The IC card reader/writer according to claim 3, wherein the first and second plates are latchably joined together at the pair of opposite-side bent sections.

7. The IC card reader/writer according to claim 3, wherein the first and second plates are latchably joined together at the contact section and at the pair of opposite bent sections.

8. The IC card reader/writer according to claim 1, wherein the first and second plates are adhesively joined together at the contact section.

9. The IC card reader/writer according to claim 3, wherein the first and second plates are adhesively joined together at the contact section and at the pair of opposite bent sections.

10. The IC card reader/writer according to claim 1, wherein the first and second plates with the IC card inserted in the IC card storage space have substantially the same outer configuration as that of the memory card.

* * * * *